United States Patent
Kohlen et al.

(10) Patent No.: US 10,358,986 B2
(45) Date of Patent: Jul. 23, 2019

(54) VALVE DEVICE FOR A MOTOR VEHICLE

(71) Applicants: Peter Kohlen, Neu Anspach (DE); Stefan Möbs, Rockenberg (DE); Joachim Von Willich, Selters (DE)

(72) Inventors: Peter Kohlen, Neu Anspach (DE); Stefan Möbs, Rockenberg (DE); Joachim Von Willich, Selters (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/369,976

(22) PCT Filed: Dec. 19, 2012

(86) PCT No.: PCT/EP2012/076209
§ 371 (c)(1),
(2) Date: Jun. 30, 2014

(87) PCT Pub. No.: WO2013/102562
PCT Pub. Date: Jul. 11, 2013

(65) Prior Publication Data
US 2015/0013639 A1 Jan. 15, 2015

(30) Foreign Application Priority Data
Jan. 3, 2012 (DE) ......... 10 2012 200 054

(51) Int. Cl.
*F02D 9/08* (2006.01)
*F02D 9/10* (2006.01)
*F16K 1/22* (2006.01)

(52) U.S. Cl.
CPC ............ *F02D 9/08* (2013.01); *F02D 9/101* (2013.01); *F16K 1/222* (2013.01); *F02D 9/107* (2013.01); *F02D 9/1025* (2013.01)

(58) Field of Classification Search
CPC .......... F02D 9/107; F02D 9/1015; F02D 9/10; F02D 9/101; F02D 9/08; F02D 9/1025; F16K 1/222
USPC ......................................... 123/337
See application file for complete search history.

(56) References Cited

U.S. PATENT DOCUMENTS

| | | |
|---|---|---|
| 2,014,000 A | 9/1935 | Kennedy |
| 2,271,390 A | 1/1942 | Dodson |
| 2,680,592 A | 6/1954 | Zierer |
| 2,994,517 A | 8/1961 | Fenton |
| 3,974,860 A | 8/1976 | Stead et al. |
| 4,420,438 A | 12/1983 | Goosen |
| 6,604,516 B1 | 8/2003 | Krimmer et al. |

(Continued)

FOREIGN PATENT DOCUMENTS

| | | |
|---|---|---|
| DE | 913 597 | 6/1954 |
| DE | 197 01 246 | 7/1998 |

(Continued)

OTHER PUBLICATIONS

Search Report dated Nov. 28, 2016 which issued in the corresponding European Patent Application No. 12810247.2.

*Primary Examiner* — Sizo B Vilakazi
(74) *Attorney, Agent, or Firm* — Cozen O'Connor

(57) ABSTRACT

A valve device for a motor vehicle includes a housing, a flow channel located in the housing, and a flap arranged in the flow channel for closing the flow channel. The flap has regions in which a shaft penetrating the flap is fastened, and the shaft is rotatably supported in the housing. The flap has a spherical elevation at least on one side.

13 Claims, 4 Drawing Sheets

(56) References Cited

U.S. PATENT DOCUMENTS

2006/0000279 A1    1/2006  Jamnia et al.
2012/0312010 A1   12/2012  Yasoshima

FOREIGN PATENT DOCUMENTS

| DE | 198 58 626 | | 5/2000 |
|----|---|---|---|
| DE | 10 2004 004 102 | | 1/2005 |
| DE | 10 2005 029 785 | | 1/2007 |
| DE | 10 2005 047 544 | | 5/2007 |
| DE | 10 2008 011 713 | | 9/2009 |
| DE | 10 2010 00874 | A1 | 8/2011 |
| DE | 10 2010 011 292 | | 9/2011 |
| EP | 0 708 232 | A2 | 4/1996 |
| EP | 2 177 797 | A1 | 4/2010 |
| JP | 61-105373 | | 5/1986 |
| JP | S61-256078 | | 11/1986 |
| JP | 11-37308 | | 2/1999 |
| JP | 2003-505649 | | 2/2003 |
| JP | 2007-239667 | | 9/2007 |
| JP | 2007-332789 | | 12/2007 |
| JP | 2008-053081 | | 3/2008 |
| WO | WO 98/24671 | A1 | 6/1998 |
| WO | WO 2011/108331 | | 9/2011 |

VALVE DEVICE FOR A MOTOR VEHICLE

CROSS-REFERENCE TO RELATED APPLICATIONS

This is a U.S. national stage of application No. PCT/EP2012/076209, filed on 19 Dec. 2012, which claims priority to the German Application No. 10 2012 200 054.2, filed 3 Jan 2012, the content of both incorporated herein by reference.

BACKGROUND OF THE INVENTION

1. Field of the Invention

The present invention relates to a valve device for a motor vehicle, having a housing, a flow channel located in the housing, and a flap arranged in the flow channel for closing the flow channel, wherein the flap is fastened on a shaft, and the shaft is rotatably supported in the housing.

2. Related Art

Valve devices of this kind are used as throttle assemblies, for example, and have long been known. By the rotatably supported flap, it is possible to fully close the flow channel or, by rotating the flap through 90°, to open the flow channel in such a way that a maximum mass flow occurs. Accordingly, the valve device is designed for the maximum mass flow and hence for the free flow cross section in the region of the flap. The disadvantage here is that different valve devices with correspondingly designed housings and the flow channels, in particular flow cross sections, running therein are necessary for different requirements. The housings are composed of metal or plastic and are produced by casting or injection molding. Accordingly, the production of the housings requires an equally large number of different casting molds.

SUMMARY OF THE INVENTION

It is an object of the invention to provide a valve device by which different maximum mass flows can be achieved with just one flow channel cross section.

This object is achieved by virtue of the fact that the flap has a spherical elevation on at least one side.

The spherical elevation has the effect that a smaller flow cross section is available in the flow channel for the maximum mass flow when the flap is fully open than would be the case with a disk-shaped flap. The use of the flap according to the invention thus allows the use of a housing with a flow channel, the cross section of which is designed for a maximum mass flow or the flow cross section. Adapting the valve device to the respective maximum mass flow is made possible by the use of a flap since the flow cross section is reduced by careful design of the at least one spherical elevation. Thus, all that is necessary is to adapt the flap according to the desired requirements, while the remainder of the valve device can be used without alteration for all applications. In this context, all flaps of disk-shaped design, apart from the regions in which the shaft passes through the, flap are regarded as disk-shaped flaps. The regions in which the shaft passes through the flap must therefore necessarily deviate from the flat disk-shaped design since these regions are often used to secure the flap on the shaft.

Hemispherical elevations in the form of spherical caps or semi-ellipsoidal elevations have proven particularly advantageous as spherical elevations since they have a shape favorable in terms of flow. Using such shapes, it is also possible at the same time to reduce turbulence during passage through the flap, which improves flow.

A particularly large reduction in the maximum mass flow is achieved with a flap having a spherical elevation on both sides.

A symmetrical flow profile in the region of the flap is achieved by virtue of the fact that the heights of the two spherical elevations are the same on both sides of the flap.

However, it is also conceivable, for reasons connected with flow, to make the heights of the two spherical elevations different on the two sides of the flap.

In an advantageous embodiment, the at least one spherical elevation is a spherical cap, wherein the diameter of the spherical cap lies on the flap in a region that extends from the radius of the flap to the diameter of the flap. The advantage of this embodiment is that a flow cross section that extends over the entire extent of the flow channel is thereby obtained.

In another embodiment, the at least one spherical elevation is a semi-ellipsoidal elevation. Design as a semi-ellipsoidal elevation has the advantage that the flow cross section on the respective side of the flap can be varied within wide limits through appropriate alignment of the semi-ellipsoidal elevation. Depending on whether the longest axis of the semi-ellipsoidal elevation, which is always arranged in the plane of the flap, is aligned parallel with or perpendicular to the shaft, either two main flow cross sections are formed close to the shaft or one flow cross section is formed in the region of the flow channel remote from the shaft. In addition to the alignment of the axes, however, the choice of length of the axes also has a decisive influence on the shape and size of the flow cross section.

In an advantageous embodiment, connecting the flap to the shaft by laser welding is particularly simple if the spherical elevation has a recess extending as far as the shaft.

In another embodiment, the flap is connected to the shaft by screwing. This method of connection has the advantage that the recess for the screw can be made smaller than in the case of laser welding and that the screw head almost completely fills the recess. This has the advantages that, on the one hand, the screw head does not project into the flow cross section and that, on the other hand, influencing of the flow behavior by the recess is minimized.

According to another embodiment for applications with temperature stresses of up to 150° C., the flap can be composed of plastic, whereby a particularly light flap is created. At higher temperatures, flaps made of metal are used.

The flap according to the invention is particularly simple to produce if it is in one piece.

In another embodiment, the flap is of a multi-piece construction, with at least one spherical elevation being connected to a main body of the flap. This embodiment has the advantage that conventional disk-shaped flaps can be used as the main body of the flap, and only the spherical elevations have to be fitted in respect of the requirements of the respective application.

The individual flap components can be connected by welding, adhesive bonding or screwing. It has an advantageous effect on costs if the flap components are simultaneously connected to the shaft by welding or screwing, for example.

BRIEF DESCRIPTION OF THE DRAWINGS

The invention is explained in greater detail by a number of illustrative embodiments. In the drawings.

DETAILED DESCRIPTION OF THE PRESENTLY PREFERRED EMBODIMENTS

Figure 1:
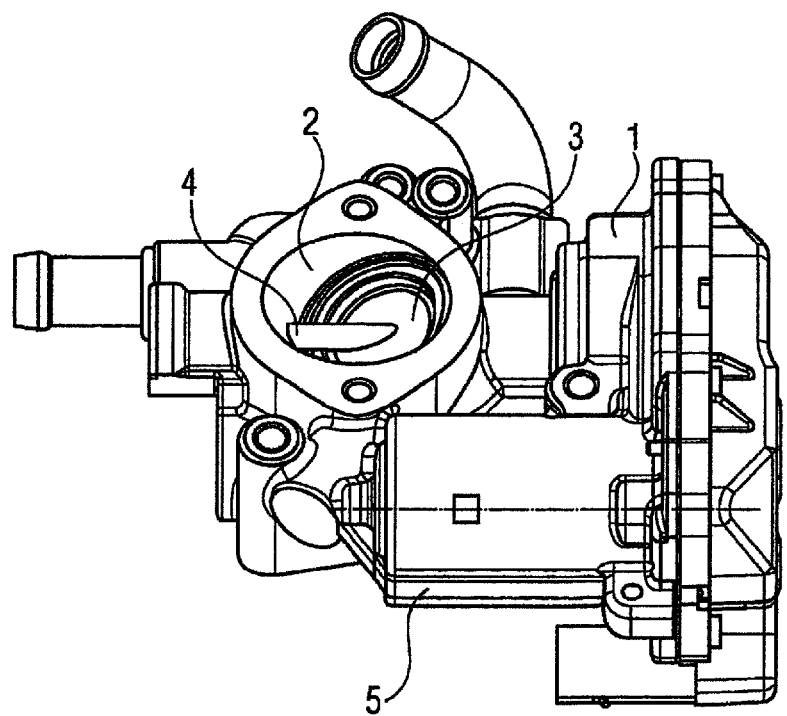
FIG. 1 shows a valve device according to the prior art in section.

FIG. 1 shows a valve device according to the prior art, having a housing 1 and a flow channel 2, which is located in the housing and in which a disk-shaped flap 3 is arranged. The flap 3 is connected securely to a shaft 4, and the shaft 4 is rotatably supported in the housing 1. The shaft 4 is driven by an electric motor 5 arranged in the housing, wherein a transmission is arranged between the shaft 4 and the electric motor 5.

Figure 2:
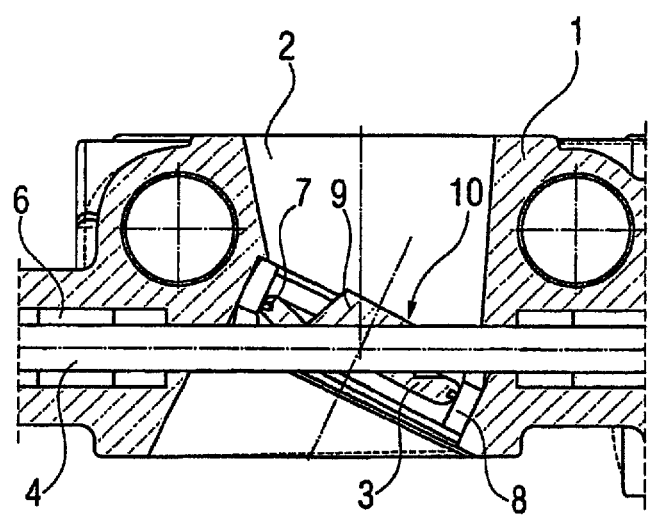
FIG. 2 shows the device according to FIG. 1 in section.

FIG. 2 shows the region of the flow channel 2 according to FIG. 1 in section. The shaft 4 is rotatably supported in the housing 1 by bushes 6. The disk-shaped flap 3 is secured on the shaft 4 for conjoint rotation by a welded joint. In the illustration shown, the flap 3 fully closes the flow channel 2. Sealing is effected by a sealing ring 7, which is arranged in a groove in the flap 3. The sealing ring 7 seals the flow channel relative to the inner wall of a ring 8 inserted into the flow channel 2. When the shaft 4 is rotated, the flap 3 opens, exposing a flow cross section in the flow channel 2, which becomes larger with increasing rotation. On one side, the disk-shaped flap 3 has a frustoconical elevation 9. The elevation 9 serves as a reinforcement for the disk-shaped flap 3 in the region in which the flap 3 is connected to the shaft 4. In this illustrative embodiment, the flap 3 and the shaft 4 are welded to one another, for which purpose the elevation 9 has a recess 10 extending as far as the shaft 4.

Figure 3:
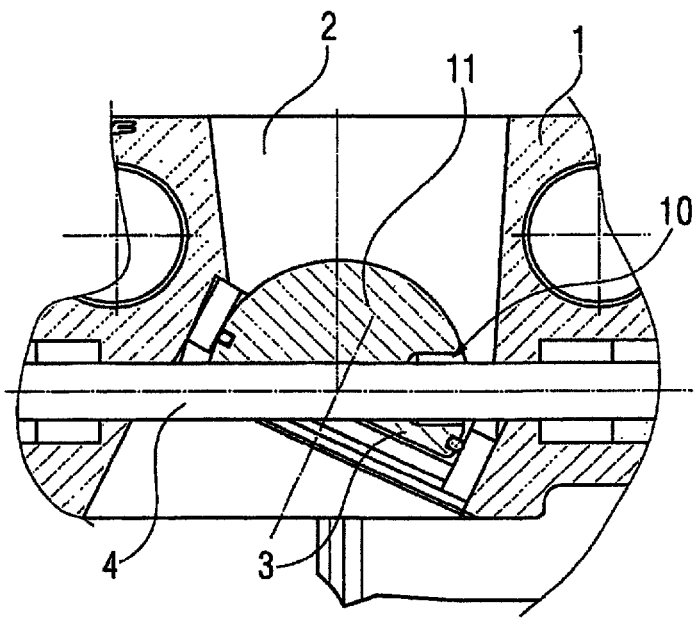
FIG. 3 shows a valve device according to the invention in section.

The flap 3 according to the invention in FIG. 3 has a spherical elevation in the form of a spherical cap 11 on one side, wherein the spherical cap 11 is a hemisphere in this case. The spherical cap 11 is of one-piece design with the flap 3. As regards its dimensions, the spherical cap 11 is configured such that its diameter corresponds to the diameter of the flap 3. The flap 3 furthermore has a recess 10 extending as far as the shaft 4 to enable the flap 3 to be connected to the shaft 4 for conjoint rotation by laser welding.

Figure 4:
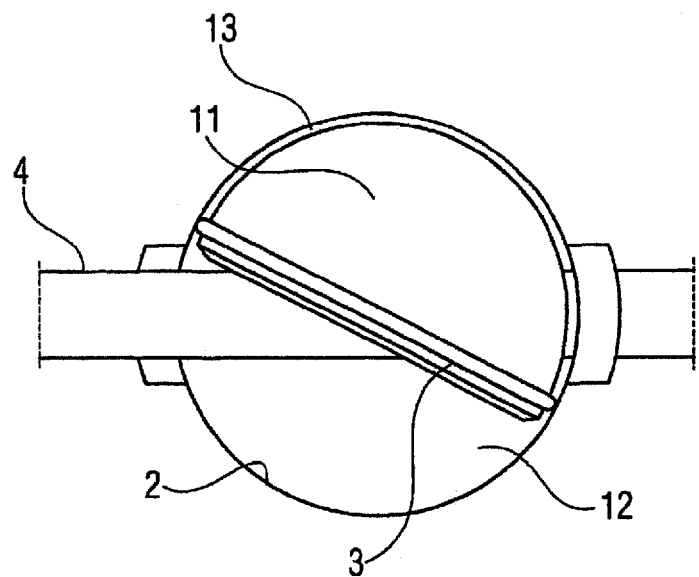

In FIG. 4, the flow channel 2 is illustrated with the opened flap 3 from FIG. 3. Owing to the arrangement of the spherical cap 11, the flow cross section 12 with the flap 3 opened is reduced by almost half as compared with a disk-shaped flap. The narrow gap 13 remaining between the spherical cap 11 and the wall of the flow channel 2 on the side of the spherical cap 11 results from the differing dimensions of the sealing ring 7 and of the spherical cap 11. In this way, a significant reduction in the flow cross section 12 is achieved with a spherical elevation of relatively simple configuration.

Figure 5:
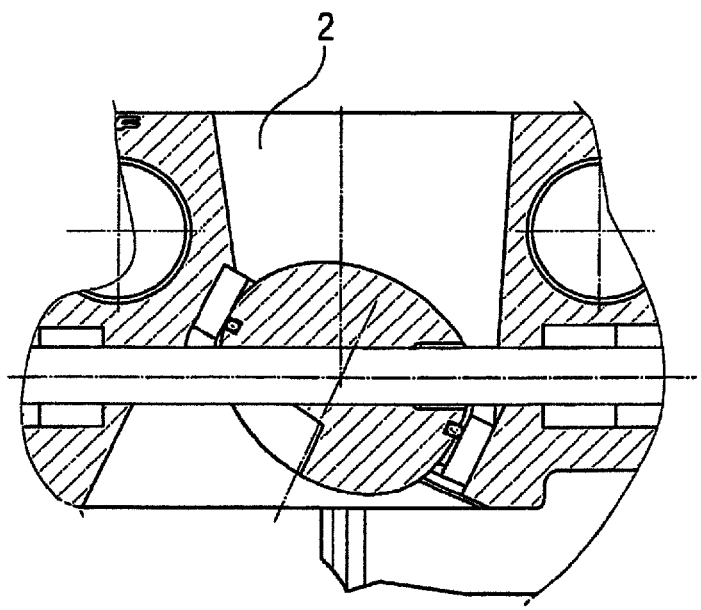
FIGS. 4-7 show further embodiments of the flap.

The flap 3 in FIG. 5 differs from the flap in FIG. 3 in that both sides of the flap 3 have a spherical elevation, the elevations having the shape of a semi-ellipsoidal elevation 14. The longest axes of the semi-ellipsoidal elevations 14 correspond in length to the diameter of the flap 3. Moreover, the longest axes are aligned relative to the shaft 4 in such a way that flow cross sections 12 form in those regions of the flow channel 2 that are remote from the shaft 4. The semi-ellipsoidal elevations 14 allow an improved flow profile since turbulence during flow around the flap 3 is reduced by the shape of the elevation. Here too, a recess 10 extending as far as the shaft 4 is provided to enable the flap 3 to be connected to the shaft 4 for conjoint rotation by welding.

Figure 6:
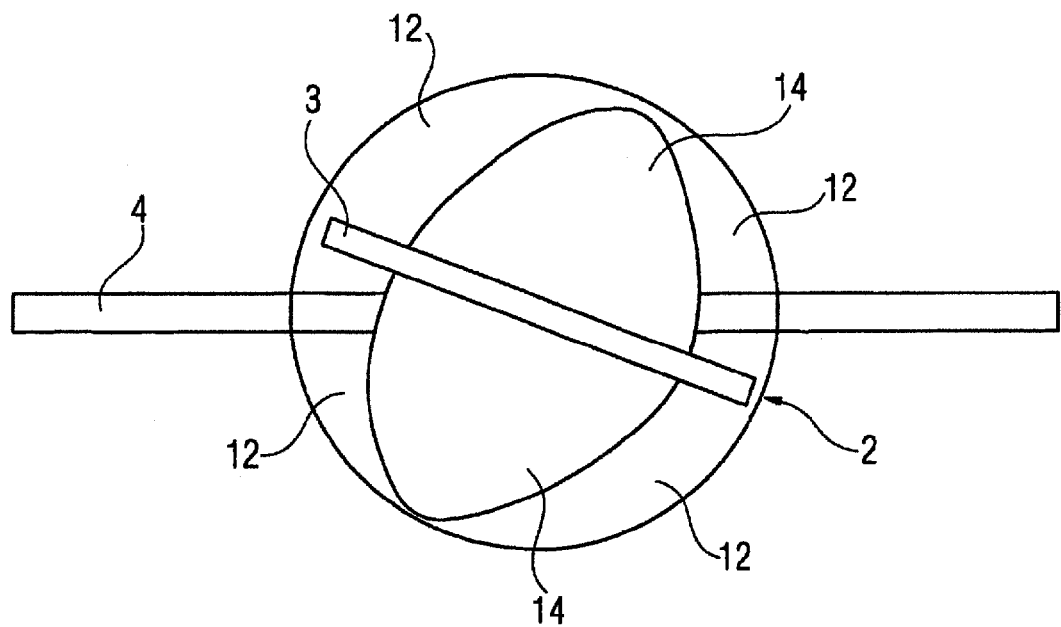

FIG. 6 shows a flap 3 in schematic form with semi-ellipsoidal elevations 14 arranged on both sides, although, in contrast to FIG. 5, these are aligned with the longitudinal axis thereof perpendicular to the shaft 4. In this way, two flow cross sections 12 are formed on each side of the flap 3.

In addition, it is also possible to configure a flap 3 with different spherical elevations 11, 14 by arranging a spherical cap on one side and a semi-ellipsoidal elevation on the other side. In addition to the shape, it is also possible for the dimensions of the respective spherical elevations to be different if the diameter or the longest axis is chosen from a range lying between the radius and the diameter of the flap 3.

Figure 7:
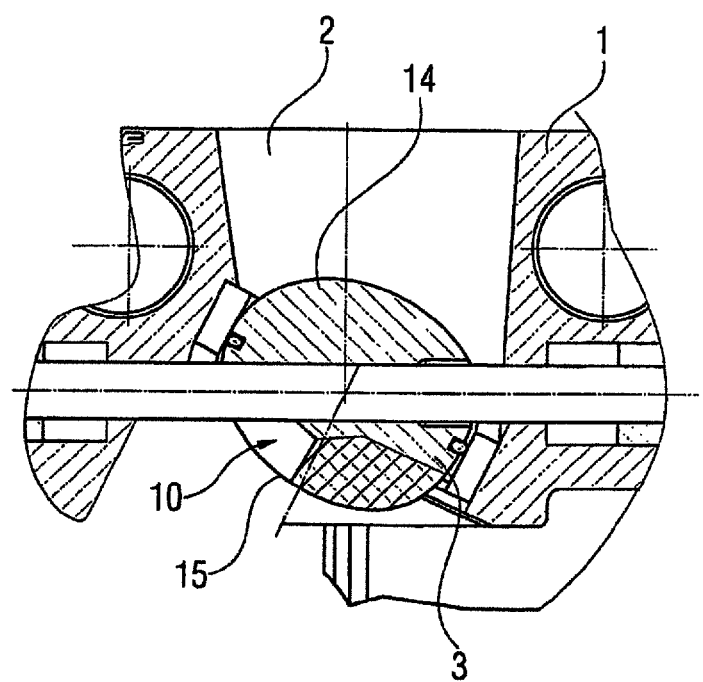

While the flaps 3 in FIGS. 3-6 are of one-piece configuration, the flap 3 in FIG. 7 has a multi-piece construction. The flap 3, which, for its part, already has a spherical elevation in the form of a semi-ellipsoidal elevation 14 on one side, is connected to a second, separate semi-ellipsoidal elevation 15 by welding. In this arrangement, the recess 10 is simultaneously used for connecting the separate elevation 14 to the flap 3. By this construction, the range of uses of flaps with just one spherical elevation is extended. However, it is also conceivable to use a conventional flap as a main body of the flap and to connect the main body to one or two separate spherical elevations to give the finished flap, depending on the use.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve device for a motor vehicle, comprising:
a housing;
a flow channel arranged in the housing;
a hemispherical-solid-shaped flap arranged in the flow channel and configured to close the flow channel; and
a shaft rotatably supported in the housing and penetrating the hemispherical-solid-shaped flap,
wherein the hemispherical-solid-shaped flap has a circular base having a diameter and has regions in which the shaft is fastened, and
wherein the spherical elevation of the hemispherical-solid-shaped flap has a radius one half the length of the diameter of the circular base of the flap.

2. The valve device as claimed in claim 1, wherein the flap has a spherical elevation on both sides.

3. The valve device as claimed in claim 2, wherein the spherical elevations are of the same size.

4. The valve device as claimed in claim 2, wherein the spherical elevations are different from one another.

5. The valve device as claimed in claim 1, wherein the spherical elevation is a spherical cap.

6. The valve device as claimed in claim 1, wherein the at least one spherical elevation has an ellipsoid shape.

7. The valve device as claimed in claim 6, wherein the longest axis of the at least one ellipsoidal elevation lies in the plane of the flap and runs perpendicularly to the direction of flow.

8. The valve device as claimed in claim 6, wherein the longest axis of the at least one ellipsoidal elevation lies in the plane of the flap and runs in the direction of flow.

9. The valve device as claimed in claim 1, wherein the spherical elevation has a recess extending as far as the shaft, and the hemispherical-solid-shaped flap is welded to the shaft.

10. The valve device as claimed in claim 1, wherein the hemispherical-solid-shaped flap is connected to the shaft by a screwed joint.

11. The valve device as claimed in claim 1, wherein the spherical elevation is formed integrally with the hemispherical-solid-shaped flap.

12. The valve device as claimed in claim 1, wherein at least one spherical elevation is a separate component, which is connected to the flap.

13. The valve device as claimed in claim 9, wherein the hemispherical-solid-shaped flap is welded to the shaft by laser welding.

* * * * *